(12) United States Patent
Menon

(10) Patent No.: US 9,383,768 B1
(45) Date of Patent: Jul. 5, 2016

(54) COMPRESSIVE AND ELASTIC BONDING COMPONENT OF AN ELECTRONIC DEVICE

(71) Applicant: Amazon Technologies, Inc., Reno, NV (US)

(72) Inventor: Anoop Menon, Capitola, CA (US)

(73) Assignee: Amazon Technologies, Inc., Reno, NV (US)

( * ) Notice: Subject to any disclaimer, the term of this patent is extended or adjusted under 35 U.S.C. 154(b) by 111 days.

(21) Appl. No.: 14/228,702

(22) Filed: Mar. 28, 2014

(51) Int. Cl.
*G06F 1/16* (2006.01)

(52) U.S. Cl.
CPC .................................. *G06F 1/1601* (2013.01)

(58) Field of Classification Search
CPC ........................................................ G06F 1/16
See application file for complete search history.

(56) References Cited

U.S. PATENT DOCUMENTS

| | | | | |
|---|---|---|---|---|
| 5,360,504 | A | | 11/1994 | Fell et al. |
| 5,433,911 | A | * | 7/1995 | Ozimek ............ H01L 27/14618 156/101 |
| 6,812,976 | B2 | * | 11/2004 | Satonaka .......... G02F 1/133308 349/58 |
| 7,974,082 | B2 | * | 7/2011 | Uchimi ................ G06F 1/1609 248/917 |
| 7,978,281 | B2 | * | 7/2011 | Vergith ................ H05K 5/0204 349/161 |
| 8,848,350 | B2 | * | 9/2014 | Kim ....................... G06F 1/1626 200/512 |
| 8,873,226 | B1 | * | 10/2014 | Peters .................... G06F 1/1613 361/679.01 |
| 8,885,350 | B2 | * | 11/2014 | Liu .................... G02F 1/133308 174/252 |
| 8,896,994 | B2 | * | 11/2014 | Abe ........................ G06F 1/162 349/58 |
| 8,934,227 | B2 | * | 1/2015 | Cheon ...................... H05K 5/02 345/905 |
| 2008/0014386 | A1 | | 1/2008 | Murphy et al. |
| 2011/0315316 | A1 | | 12/2011 | Welke et al. |
| 2013/0071601 | A1 | | 3/2013 | Bibl et al. |
| 2013/0333692 | A1 | | 12/2013 | Li et al. |
| 2015/0234430 | A1 | * | 8/2015 | Gupta ................... G06F 1/1643 345/174 |

\* cited by examiner

*Primary Examiner* — Lisa Lea Edmonds

(74) *Attorney, Agent, or Firm* — K&L Gates LLP

(57) ABSTRACT

An electronic device may include a display assembly that is adhered to a cover sheet and the cover sheet is elastically bonded to a frame with a compressive and elastic bonding component. Inside the device, the display assembly is spaced apart from the frame, which allows the display assembly to bend or move. The compressive and elastic bonding component has two strong adhesive layers and a low modulus layer that dissipates stress of the display assembly via the cover sheet, such that the compressive and elastic bonding component permits the cover sheet to bend.

19 Claims, 7 Drawing Sheets

COMPRESSIVE AND ELASTIC BONDING COMPONENT OF AN ELECTRONIC DEVICE

BACKGROUND

Popular electronic devices include tablet computers, electronic book readers and smartphones. Such electronic devices typically include a housing, a display assembly and a cover sheet. The cover sheet is typically a rigid sheet, such as a sheet of toughened glass, which protects the display assembly while being sufficiently transparent as to permit viewing of the images generated by the display assembly. It is advantageous for a cover sheet to be scratch and damage resistant, while also being thin and light. In order to ensure that the cover sheet remains coupled to a frame, the cover sheet can be rigidly coupled to the frame. Such a rigid coupling is believed to be beneficial in order for the cover sheet to remain coupled to the frame after an electronic device is subject to an external force, such as an impact from being dropped.

Although such electronic devices are expected to be durable, they may be subject to stress that causes damage beyond normal wear and tear. Accordingly, there is a need to increase the durability of such electronic devices.

DETAILED DESCRIPTION

In the following description, reference is made to the accompanying drawings which illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

In accordance with embodiments of the present invention, mobile computing devices are provided with a cover sheet, such as a cover glass, coupled to a frame, such as a housing, via a compressible and elastic bonding component. A display assembly is rigidly coupled to the underside of the cover sheet inside of the frame, and the display assembly may be spaced apart from the frame, thereby providing clearance for the display assembly to move or bend within the frame. The bending of the display assembly may cause a shear force on the cover sheet, which is rigidly coupled to the display assembly. Because the cover sheet is coupled to the frame with the compressive and elastic bonding component, the cover sheet is free to move or bend with the display assembly, thereby preventing undesirable levels of shear stress and possible delamination between the display assembly and the cover sheet. The compressive and elastic bonding component may comprise a low modulus layer between two adhesive layers, which may allow transfer of stress from the display assembly to the cover sheet.

Figure 1:
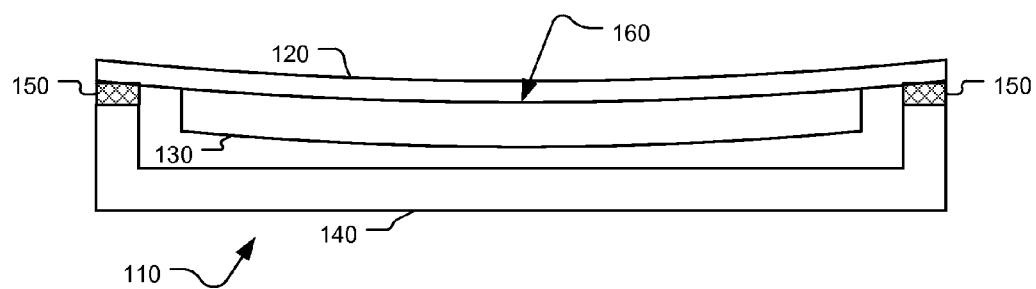
FIG. 1 illustrates an example schematic cross-sectional view of an electronic device at line A-A of the embodiment of FIG. 5, in accordance with various embodiments of the present invention.
Figure 5:
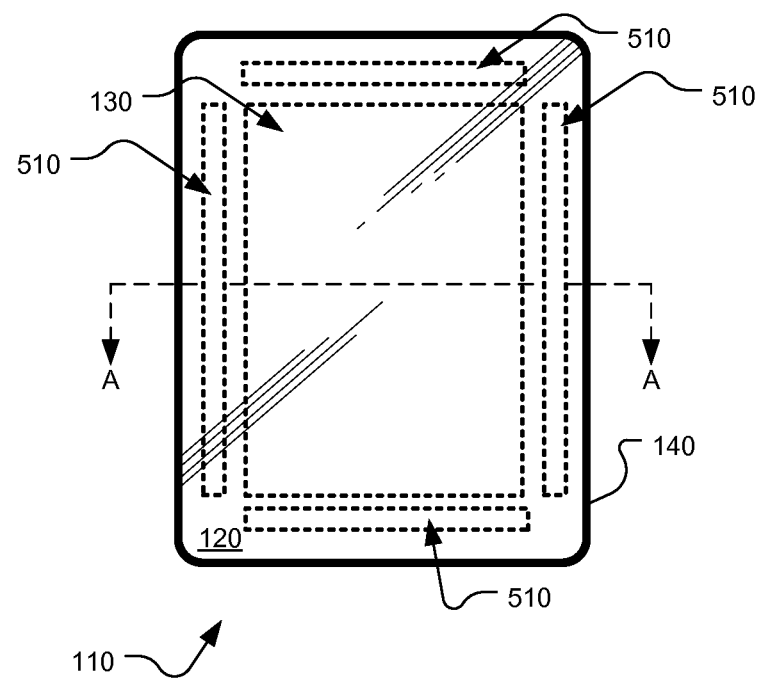
FIG. 5 illustrates a front view of an example electronic device, in accordance with various embodiments of the present invention.

FIG. 1 illustrates an example schematic cross-sectional view of an electronic device 110 at line A-A of the embodiment of FIG. 5, in accordance with various embodiments of the present invention. In the illustrated embodiment, a display assembly 130 may be rigidly adhered to a cover sheet 120, such as a cover glass, which may be elastically bonded to a frame 140, such as a housing. In the embodiment illustrated in FIG. 7, the display assembly 130 comprises a display panel 710, a light component such as a light source 770 and a light guide 730, and adhesive layers such as silicone liquid optically clear adhesive (LOCA) 720, silicone solid optically clear adhesive (OCA) 740 and acrylic OCA 750. A cover sheet 120 may be made from materials such as glass, fortified glass, reinforced glass, plastic, thermoplastic and the like. In some embodiments, the display assembly 130 may reside in a cavity of the frame 140 and the display assembly 130 may be spaced apart from the frame 140. In some embodiments, the display assembly 130 comprises a first surface and a second surface, and the first surface of the display assembly 130 is rigidly coupled to the cover sheet 120 and the second surface of the display assembly 130 is spaced apart from the base 640 of the frame 140. In some embodiments, there may be at least one gap or space surrounding portions of the sides of the display assembly 130 that are not coupled to the cover sheet 120. In some embodiments, because the gap provides space or room for the display assembly 130 to move, the gap may allow bending of the cover sheet 120 and/or display assembly 130 such that a portion of the display assembly 130 moves within the gap. Furthermore, a gap may accommodate mechanical tolerances of a display assembly 130 comprising multiple layers, as described below. The cover sheet 120 may be elastically bonded to the frame 140 with a compressive and elastic bonding component 150. It is to be appreciated that, although FIG. 1 illustrates a frame that is an external housing of an electronic device 110, in some embodiments, a frame or portions of a frame may be internal to an electronic device.

Figure 2:
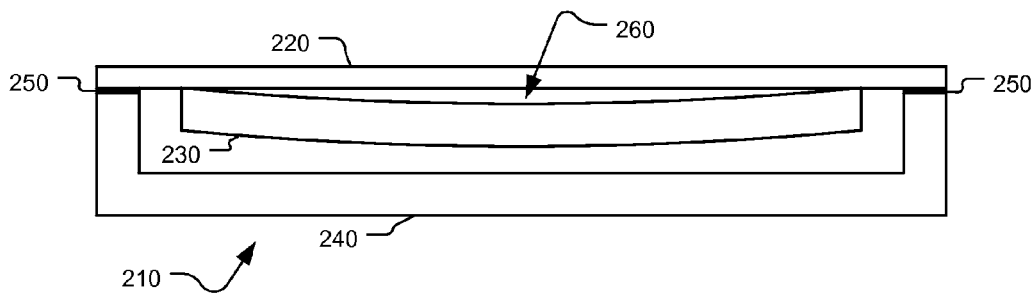
FIG. 2 illustrates an example schematic cross-sectional view of an electronic device utilizing a rigid bonding component.

FIG. 2 illustrates an example schematic cross-sectional view of an electronic device 210 in which the cover sheet 220 is rigidly bonded to the frame 240 with a rigid bonding component 250, in contrast to being elastically bonded as illustrated in FIG. 1. The cover sheet 220 may also be rigidly bonded to the display assembly 230. With this configuration, because the cover sheet 220 is rigidly bonded to the frame 240 with a rigid bonding component 250, if the display assembly 230 experiences a force relative to the cover sheet 220, such as bending, warping, or thermal expansion, stress may be caused at the region of contact between the display assembly 230 and the cover sheet 220. In an extreme case, the display stack may delaminate, resulting in the display assembly 230 separating from the cover sheet 220, as shown at the delamination area 260 in FIG. 2. For example, an electronic device may be subject to excessive heat, such as when an electronic device is left resting on an automobile dashboard when the automobile is parked with the windows closed on a hot sunny day. Such extreme heat may cause components of an electronic device to experience or undergo stress, which may cause such components to warp or deform. For example, the display assembly 230 of the electronic device 210 may deform or warp when it is subject to high ambient temperature for a period of time, such as 85 degrees Celsius or greater for a period of time of two hours or longer.

In contrast, in the configuration illustrated in FIG. 1, in accordance with various embodiments of the present invention, the cover sheet 120 is not rigidly bonded to the frame 140. Instead, the cover sheet 120 is bonded to the frame 140 via a compressive and elastic bonding element 150, which permits the cover sheet 120 to move relative to the frame 140. As a result, if the display assembly 130 bends or warps, the cover sheet 120, which is bonded to the display assembly 130 is free to bend or warp with the display assembly 130, thereby reducing the stress at the lamination area 160 between the display assembly 130 and the cover sheet 120. As a result, the stress may be dissipated or relieved by the compressive and elastic bonding component 150. Accordingly, the display assembly 130 and the cover sheet 120 may remain adhered at the lamination area 160.

Figure 3C:
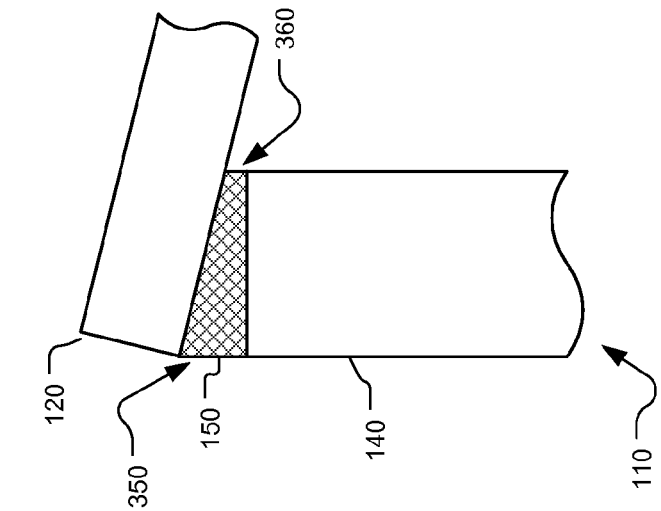
FIGS. 3A-3C illustrate example portions of schematic cross-sectional views portions of a frame and a cover sheet of an electronic device, in accordance with various embodiments of the present invention.
Figure 3B:
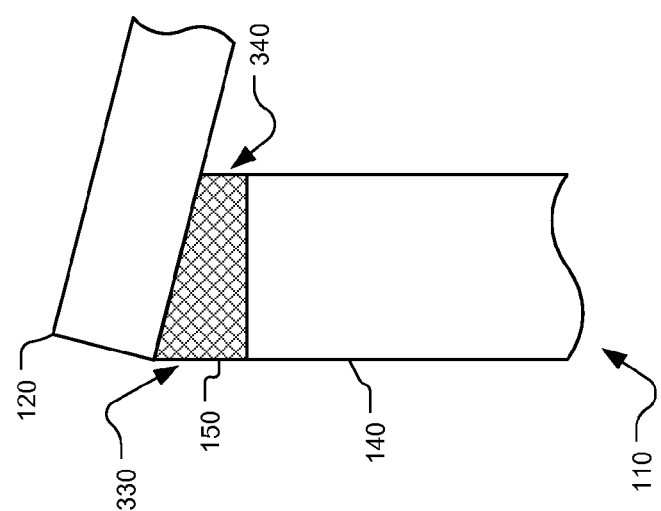
Figure 3A:
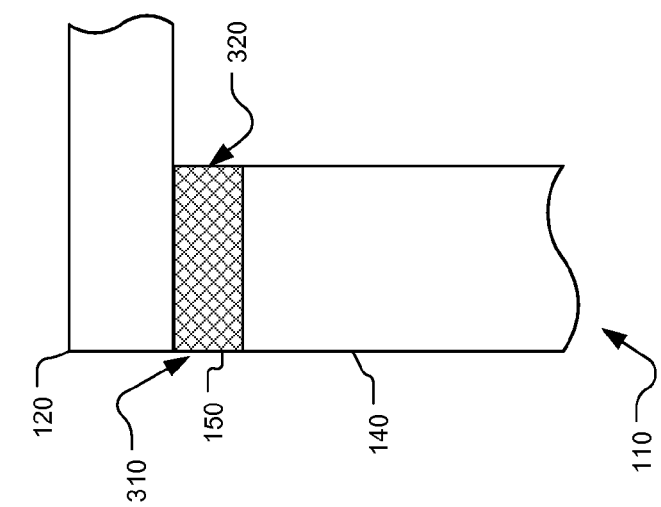

FIG. 3A illustrates an example portion of a schematic cross-sectional view of an electronic device 110 illustrating portions of a frame 140 and a cover sheet 120, in accordance with various embodiments of the present invention. As illustrated in FIG. 3A, a cover sheet 120 is coupled to a frame 140 with a compressive and elastic bonding component 150. Though not shown in FIG. 3A, a display assembly 130 is not experiencing or undergoing stress, in comparison to the electronic device 110 illustrated in FIG. 1. Accordingly, the portion of the cover sheet 120 coupled to the frame 140 may lay flat on or perpendicular to the portion of the frame 140 coupled to the cover sheet 120. Under this embodiment of the electronic device 110 with a display assembly 130 not substantially subject to stress, a portion 310 of the compressive and elastic bonding component 150 may have a similar area to the area of a portion 320 of the compressive and elastic bonding component 150.

FIG. 3B illustrates an example portion of a schematic cross-sectional view of an electronic device 110 illustrating portions of a frame 140 and a cover sheet 120, in accordance with various embodiments of the present invention. The embodiment of FIG. 3B is similar to the embodiment of FIG. 3A, except that a display assembly 130 that is not shown in FIG. 3B is experiencing or undergoing stress, similar to the stress illustrated in FIG. 1. As illustrated, the compressive and elastic bonding component 150 is expandable and compressible. For example, a portion 330 of the compressive and elastic bonding component 150 may be expanding and a portion 340 of the compressive and elastic bonding component 150 may be compressing. Accordingly, under this embodiment, the area of the portion 330 may be greater than the area of the portion 310 of FIG. 3A, and the area of the portion 340 may be less than the area of the portion 320 of FIG. 3A. In some embodiments, such expansion and compression enables the compressive and elastic bonding component 150 to dissipate at least a portion of stress or energy experienced or underwent by the display assembly 130 and transferred via the cover sheet 120. Under some embodiments, such stress dissipation prevents delamination of the display assembly 130 from the cover sheet 120, as illustrated in FIG. 1.

FIG. 3C illustrates an example portion of a schematic cross-sectional view of an electronic device 110 illustrating portions of a frame 140 and a cover sheet 120, in accordance with various embodiments of the present invention. The embodiment of FIG. 3C is similar to the embodiment of FIG. 3B, except that the compressive and elastic bonding component 150 may be compressible and generally not expandable. For example, with a display assembly 130 that is not shown in FIG. 3C experiencing or undergoing stress, a portion 360 of the compressive and elastic bonding component 150 may be compressing more than a portion 350 of the compressive and elastic bonding component 150. Accordingly, under this embodiment, the area of the portion 360 may be less than the area of the portion 350, the area of the portion 350 may be less than the area of the portion 310 of FIG. 3A, the area of the portion 360 may be less than the area of the portion 320 of FIG. 3A and the area of the portion 360 may be less than the area of the portion 340 of FIG. 3B. In some embodiments, such compression enables the compressive and elastic bonding component 150 to dissipate at least a portion of stress or energy experienced or underwent by the display assembly 130 and transferred via the cover sheet 120. Under some embodiments, such stress dissipation prevents delamination of the display assembly 130 from the cover sheet 120, as illustrated in FIG. 1.

In an alternative embodiment, FIG. 3C may illustrate a compressive and elastic bonding component 150 that is expandable and compressible. In this embodiment, a force may be applied to the cover sheet 120, such as a drop test in which an object is dropped on to the cover sheet 120. As the force is applied to the cover sheet 120, a portion 360 of the compressive and elastic bonding component 150 may compress more than a portion 350 of the compressive and elastic bonding component 150.

Figure 4:
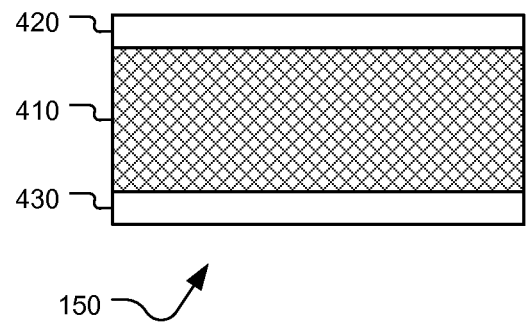
FIG. 4 illustrates an example schematic cross-sectional view of a compressive and elastic bonding component, in accordance with various embodiments of the present invention.

FIG. 4 illustrates an example schematic cross-sectional view of a compressive and elastic bonding component 150, in accordance with various embodiments of the present invention. As illustrated, the compressive and elastic bonding component 150 may comprise a low modulus layer 410 with a first adhesive layer 420 on one major side of the low modulus layer 410 and a second adhesive layer 430 on the other major side of the low modulus layer 410. Under some embodiments, a compressive and elastic bonding component 150 may have a thickness of about 200 microns.

Under some embodiments, the low modulus layer 410 may be elastic, and may have elongation capacity and compression capacity. The low modulus layer 410 may be at least one of flexible, pliable, compliant, bendable, stretchable, deformable, and expandable. A low modulus layer 410 may comprise one of Sekisui WF006 made by Sekisui Chemical Co., Ltd., Iwatani ISR-ACF, ISR-ACF-THF and ISR-TUF-RP made by Iwatani Corporation, Korel® K10-SS made by Saint Gobain Performance Plastics Corporation, and Poron® 4701-15-06021-90P made by Rogers Corporation. A low modulus layer 410 may have a thickness from 50 microns to 500 microns. Under some embodiments, the low modulus layer 410 may comprise a foam material, which may comprise acrylic, urethane, polyethylene, polypropylene, and the like. A foam material may comprise a cellular membrane structure with voids and may be closed cell, semi-closed cell, or open cell. An example density of a foam is 0.2 g/cm$^3$. An example 25% Compression Force Deflection is 0.0231 Mpa. In some embodiments, internal stress or energy of a display assembly 130 may be dissipated or released by the low modulus layer 410.

In some embodiments, the first and second adhesive layers 420, 430 are an adhesive coating. In other embodiments, the first and second adhesive layers 420, 430 are a double sided adhesive tape. It is to be understood that, although the low modulus layer 410 may be compressive and/or expansive, the first and second adhesive layers 420, 430 provide a strong bond of the compressive and elastic bonding component 150. An adhesive layer may comprise one of adhesives marketed under the brand names VHB 4914, 59XX Thin and 864XX, all from 3M Corporation. An adhesive layer may have a thickness, e.g., from 50 microns to 300 microns. In some embodiments, the adhesive layers 420, 430 may be tacky or tackified, may adhere to a variety of dissimilar surfaces, and may be based on acrylic, epoxy, urethane, silicone, polyisobutylene, cyanoacrylate, and the like.

It is to be understood that a compressive and elastic bonding component 150 may have different embodiments than that depicted in FIG. 4. For example a compressive and elastic bonding component 150 may be a gasket, an o-ring, a seal, a washer, a liner, a lining, a packing, a fastener, a formed layer, and the like, in which a low modulus material has adhesive surfaces. Furthermore, a compressive and elastic bonding component 150 may have different layers than that depicted in FIG. 4, for example, a low modulus layer 410 may comprise a plurality of intermediate layers of differing foam materials.

FIG. 5 illustrates a front view of an example electronic device 110, in accordance with various embodiments of the present invention. The electronic device 110 comprises a cover sheet 120 elastically bonded to a frame 140. A display assembly 130 is adhered to the cover sheet 120 on the side of the cover sheet elastically bonded to the frame 140, such that the cover sheet 120 may protect the display assembly 130. As illustrated, the length and width of the display assembly 130 may be less than the respective length and width of the cover sheet 120, which may allow for space on the rim of the cover sheet 120 to be elastically bonded to the frame 140. In some embodiments, the display assembly 130 may be spaced apart from the frame 140. In some embodiments, there may be at least one gap between the display assembly 130 and the frame 140. Furthermore, there may be at least one gap between the display assembly 130 and portions of other components coupled to the frame 140, notwithstanding that the display assembly 130 may be electrically coupled to other components of the electronic device 110 such as a processing element and a power supply.

As illustrated in FIG. 5, the electronic device 110 may optionally comprise a touch sensing element 510, such as a force sensing component. The touch sensing element 510 may be adhered to the cover sheet 120 adjacent the display assembly 130 and a respective wall portion of the frame 140. For example, four touch sensing elements 510 may be located generally along each side of the electronic device 110, such as between the display assembly 130 and the compressive and elastic bonding component 150. The user may cause an action to occur by interacting with the touch sensing element 510. For example, an action may be turning the page of the electronic book. Interacting with the touch sensing element 510 may comprise applying a force or a pressure to a portion of the cover sheet 120. In some embodiments, a force or pressure may be slight, such as measurable in nanograms. Furthermore, increased force or pressure may cause other actions, such as the turning of multiple pages of an electronic book. Under this embodiment, a strong bond of the compressive and elastic bonding component 150 may enhance the functionality or accuracy of a force sensing component, while the elasticity of the elastic bonding component may not degrade the functionality of a force sensing component.

It is to be understood that, under some embodiments, it is desirable for the cover sheet 120 to flex underneath an applied force or pressure by the user's touch of the cover sheet 120. For example, a cover sheet 120 that is designed to accommodate flexure may transmit force or pressure to the touch sensing element 510. Under some embodiments, at least one gap or space is provided between components that are adhered to the cover sheet 120 and other components adhered to the frame 140. Such a gap or gaps may permit relative movement of those various components, which also may permit bending or flexing of the cover sheet 120. Under some embodiments, it may be advantageous for there to be gaps in the interior of the electronic device 110, however gaps may be disadvantageous because some or all of those gaps may facilitate the warping or bending of the display assembly 130 when subject to stress, as illustrated in FIG. 1.

Under some embodiments, a touch sensing element 510 may comprise a force sensing component, which comprises one or more sensors configured to detect the application of physical pressure or force. The force sensing component may comprise one or more resistors which provide a variable resistance, such that the force sensing component exhibits a decrease in electrical resistance when an increase in force or pressure is applied to the force sensing component. In some embodiments, the force sensing component comprises a conductive polymer layer which changes resistance in a predictable manner in response to an applied force. The conductive polymer layer may comprise a film containing electrically conducting and non-conducting particles suspended in a matrix. In other embodiments, the force sensing component may comprise a piezoelectric sensor configured to measure changes in pressure, strain, or force by converting those changes into a variable electrical charge. It is to be understood that embodiments are not limited to that described for FIG. 5. For example one or more touch sensing elements may be coupled to a cover sheet 120 anywhere that it is desirable for a user to interact with such touch sensing elements. Furthermore, touch sensing elements may be incorporated into the display assembly 130 in addition to or alternatively to coupling one or more touch sensing elements to a cover sheet 120. A display assembly 130 that may incorporate or utilize one or more touch sensing elements may be a capacitance touch sensitive display, an infrared touch screen display, and the like. In addition, touch sensing elements may sense multiple forces to respective multiple portions of a cover sheet 120 such as a two-fingered touch, or may sense a force applied generally to the electronic device 110, such as a twisting or bending force applied to the electronic device 110.

Figure 6:
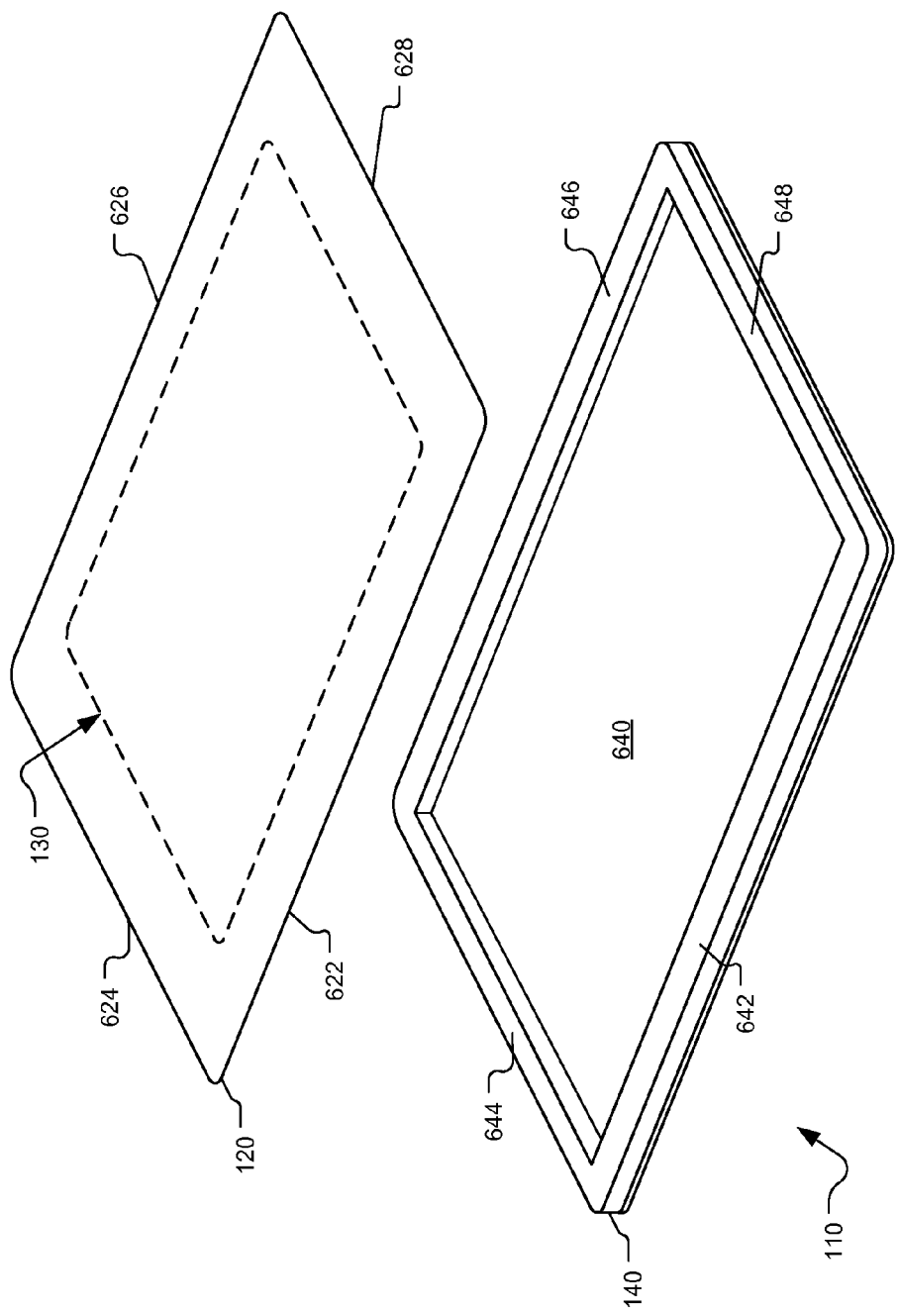
FIG. 6 illustrates an exploded perspective view of an example electronic device, in accordance with various embodiments of the present invention.

FIG. 6 illustrates an exploded perspective view of an example electronic device 110, in accordance with various embodiments of the present invention. As illustrated in FIG. 6, the width and length of the cover sheet 120 may be comparable to the width and length of the frame 140, and both may have rectangular dimensions. According to some embodiments, a first rim portion 622 of the cover sheet 120 may be elastically bonded to an upper edge of a first wall portion 642 of the frame 140, a second rim portion 624 of the cover sheet 120 may be elastically bonded to an upper edge of a second wall portion 644 of the frame 140, a third rim portion 626 of the cover sheet 120 may be elastically bonded to an upper edge of a third wall portion 646 of the frame 140, and a fourth rim portion 628 of the cover sheet 120 may be elastically bonded to an upper edge of a fourth wall portion 648 of the frame 140. In some embodiments, a display assembly 130 may be adhered to the side of the cover sheet 120 that is elastically bonded to the frame 140, and the display assembly 130 may reside in a cavity of the frame 140.

In some embodiments, a compressive and elastic bonding component 150 may be a single strip having a hollowed rectangular shape that is located between respective upper edges of wall portions of the frame 140 and respective rim portions of the cover sheet 120. In other embodiments, the compressive and elastic bonding component 150 may comprise an L-shaped strip that may be located at a corner of the frame 140 and the cover sheet 120. For example, in relation to a frame 140, an L-shaped strip may be located with one leg of the L-shaped strip adhering to an upper edge of the first wall portion 642 of the frame 140 and the other leg of the L-shaped strip adhering to an upper edge of the second wall portion 644 of the frame 140. In relation to a cover sheet 120, that same L-shaped strip may be located with one leg of the L-shaped strip adhering to a first rim portion 622 of the cover sheet 120 and the other leg of the L-shaped strip adhering to a second rim portion 624 of the cover sheet 120. In some embodiments, two L-shaped strips may be placed at two opposing corners of the frame 140, with the length of each leg of the L-shaped strips corresponding to the length of the respective wall portion of the frame 140. In some embodiments, four L-shaped strips may be placed at the respective four corners of the frame 140, with the length of each leg of the L-shaped strips corresponding to half the length of the respective wall portion of the frame 140. In some embodiments, an L-shaped strip may include a pull tab to remove a release liner of the L-shaped strip.

In some embodiments, the frame may be formed by a base portion 640, a first wall portion 642 attached to the base portion 640 along a lower edge, a second wall portion 644 attached to the base portion 640 along a lower edge and attached to the first wall portion 642 along a side edge, a third wall portion 646 attached to the base portion 640 along a lower edge and attached to the second wall portion 644 along a side edge, and a fourth wall portion 648 attached to the base portion 640 along a lower edge, attached to the third wall portion 646 along a side edge and attached to the first wall portion 642 along another side edge. In some embodiments, the frame 140 may be rectangular shaped such that the second wall portion 644 and the fourth wall portion 648 may be each located between the first wall portion 642 and the third wall portion 646, and each wall portion 642, 644, 646, 648 may be orthogonal to the base portion 640.

Although not shown, a sealing ring or a gasket may travel around or encompass the exterior or periphery of the electronic device 110 where the cover sheet 120 and the frame 140 mate. In some embodiments, a sealing ring may encompass the rim portions of the cover sheet 120, may encompass upper edges of the wall portions of the frame, and may be proximate the compressive and elastic bonding component 150. Such a ring may comprise a thermoplastic polyurethane (TPU) material. A sealing ring may seal the electronic device 110 and may protect the compressive and elastic bonding component 150 from external elements. A sealing ring may also provide protection to the rim portions of the cover sheet 120 from scratches, cracks and other damage that may be caused by external forces.

Figure 7:
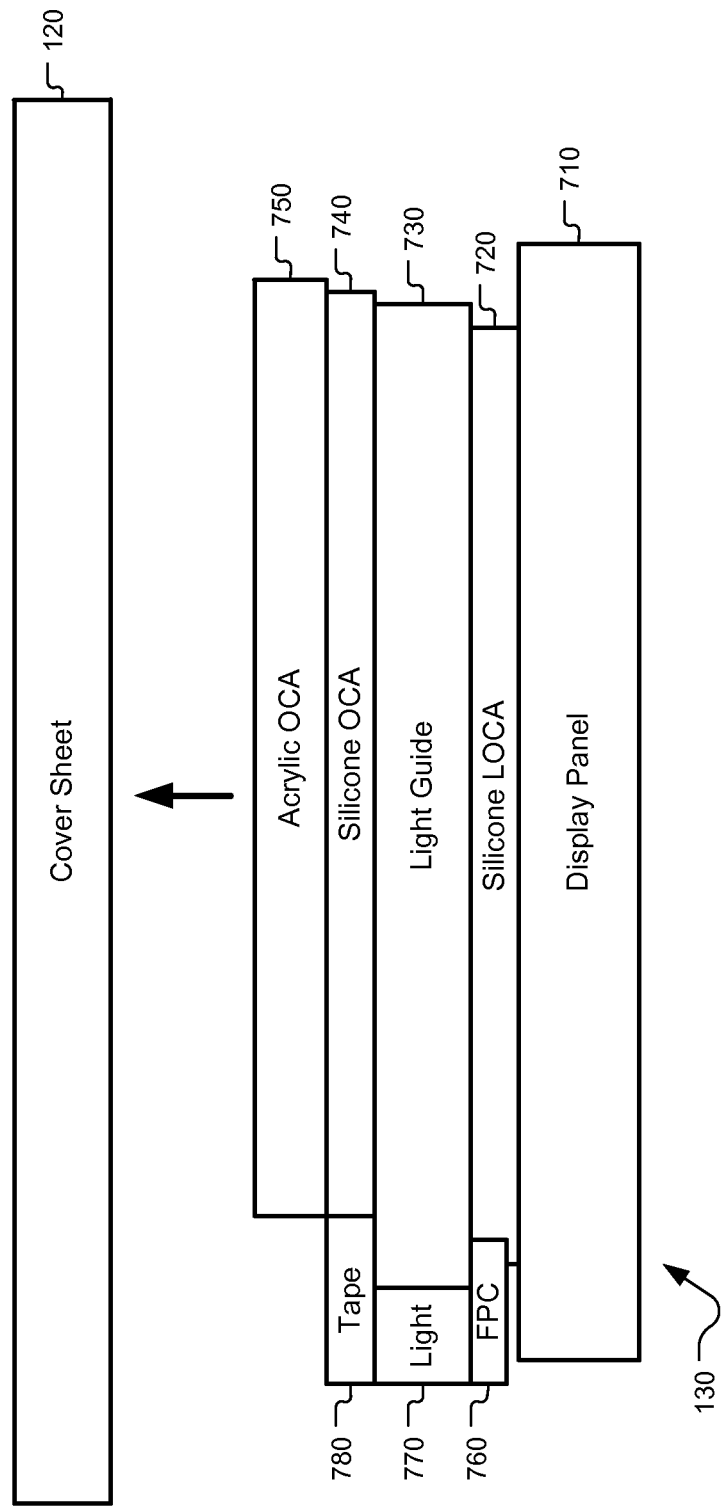
FIG. 7 illustrates an example exploded schematic cross-section of a display assembly and a cover sheet, in accordance with various embodiments of the present invention.

FIG. 7 illustrates an example exploded schematic cross-section of a display assembly 130 and a cover sheet 120, in accordance with various embodiments of the present invention. In some embodiments, a display assembly 130 may schematically comprise various stacked layers. As illustrated, a display assembly 130 may comprise a display panel 710, such as an electronic paper display. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Though not shown, in some embodiments, a display panel 710 may be coupled to a corresponding display controller.

The display panel 710 may be coupled to a light guide 730 with a liquid optically clear adhesive (LOCA) 720, which may be formed from a silicone material. The LOCA 720 may be placed atop the display panel 710, and may have a thickness of 150 microns. The LOCA 720 may comprise Loctite® 5192 made by Henkel Technologies. The light guide 730 may be a light guide film which may include grating elements for directing light from a light source 770 onto the display panel 710. The light source 770 may comprise one or more light-emitting diodes (LEDs) and may be coupled to a flexible printed circuit (FPC) 760. In addition, a white tape 780 or other type of light-diffusing reflective coating may be laid along a perimeter of the light source 770, which may help to diffuse light from the light source 770 and increase the uniformity of the light from the light source 770.

On top of the light guide 730 may be a layer or strip of solid optically clear adhesive (OCA) 740, which may be formed with a silicone material and may have a thickness of 50 microns. A silicone OCA 740 may comprise ARclear® 8932EE made by Adhesives Research, Inc. On top of the layer or strip of OCA 740 may be a layer or strip of OCA 750, which may be formed with an acrylic material and may have a thickness of 100 microns. An acrylic OCA 750 may comprise TAC EA134DD made by New Tac Kasei Co., Ltd. The acrylic OCA 750 may adhere the display assembly 130 to the cover sheet 120. It is to be understood that under some embodiments, optical bonding such as with OCA and LOCA may have a relatively weaker bond compared to a compressive and elastic bonding component 150 because of the transparent property of optical bonds that, for example, allows a user to be able to view a display of a display panel 710. Furthermore, OCA 740 may have low refractory properties, and OCA 750 may be ultraviolet (UV) cut and have a bond stronger than OCA 740.

It is to be understood that a display assembly 130 may comprise different layers than those schematically shown in FIG. 7, and that those variations of layers are encompassed within the embodiments disclosed herein. For example, when there are two or more layers of a display assembly 130, each layer may have different coefficients of expansion and contraction, such as expanding or contracting differently when subject to certain high temperatures. For further example, an adhesive layer may have different coefficients of expansion or contraction based on whether or not the adhesive layer is ultraviolet light (UV) cured. Such variance in the layers of expansion and contraction may cause internal stress to the display assembly 130 and may facilitate warping or bending of the display assembly 130. Accordingly, the compressive and elastic bonding component 150 may dissipate or absorb the stress of the different expansions and contractions of various layers of a display assembly 130, and such stress dissipation or absorption is not limited to the embodiment of a display assembly 130 illustrated in FIG. 7.

Figure 8:
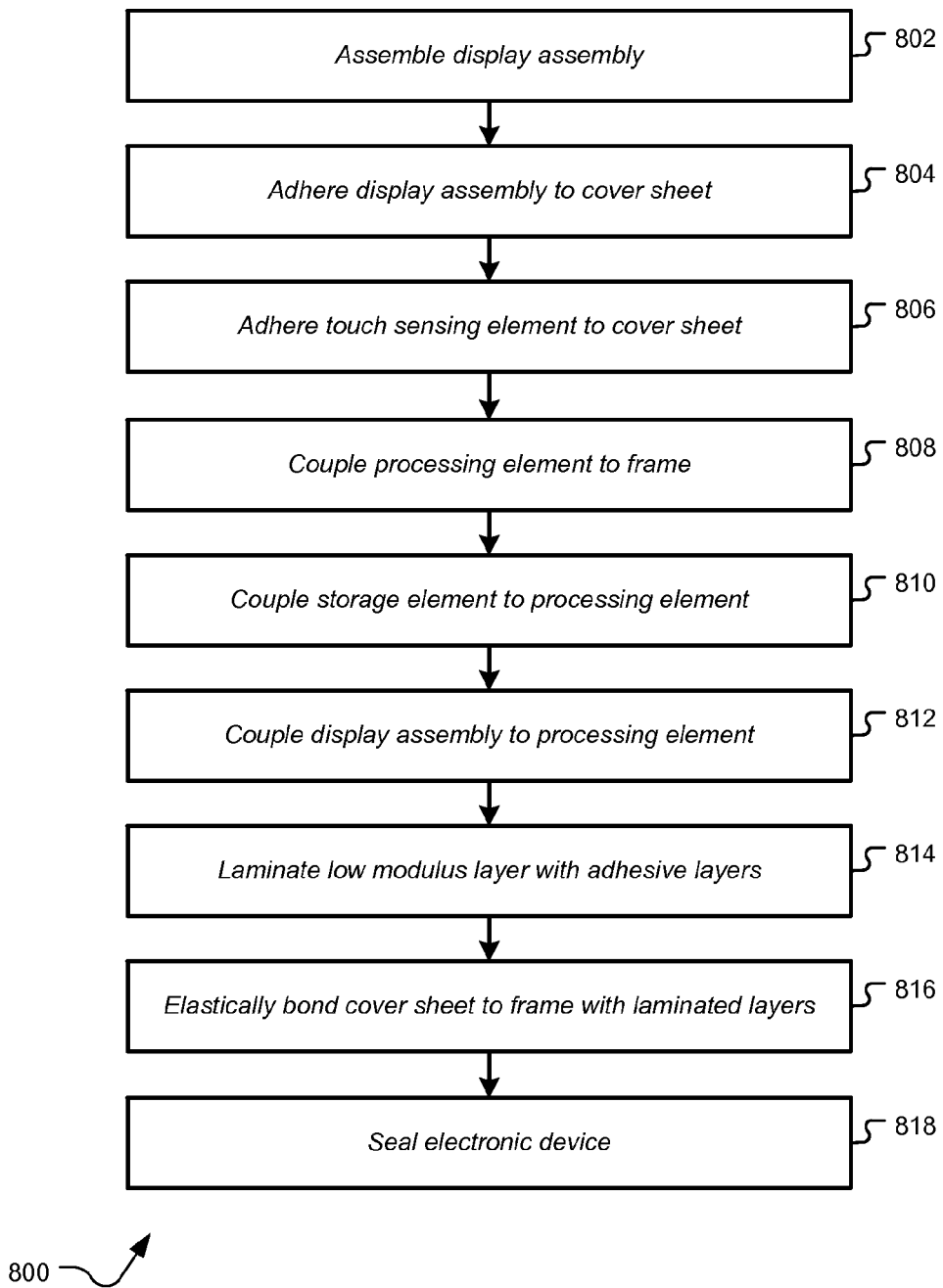
FIG. 8 illustrates an example flow diagram of assembling an electronic device, in accordance with various embodiments of the present invention.

FIG. 8 illustrates an example flow diagram of a process 800 of assembling an electronic device 110, in accordance with various embodiments of the present invention. The order in which the operations are described is not intended to be construed as a limitation, and any number of the described operations can be combined in any order and/or in parallel to implement the process. At step 802, a display assembly 130 may be assembled. An example display assembly 130 is that as illustrated in FIG. 7. At step 804, a display assembly 130 may be adhered to a cover sheet 120, such as a cover glass. At step 806, at least one touch sensing element 510, such as a force sensing component, may be adhered to the cover sheet 120 adjacent the display assembly 130. At step 808, a processing element 904 may be coupled to a frame 140, such as a housing of the electronic device 110. At step 810, a storage element 902 may be electrically coupled to the processing element 904. At step 812, the display assembly 130 may be electrically coupled to the processing element 904.

At step 814, a compressive and elastic bonding component 150 may comprise a laminated structure. For example the laminated structure may include a low modulus layer 410 with a first adhesive layer 420 and a second adhesive layer 430 to form a compressive and elastic bonding component 150. For further example, the laminated structure of a compressive and elastic bonding component may include a low modulus layer having a first major side and a second major side, a first adhesive layer adjacent the first major side of the low modulus layer, and a second adhesive layer adjacent the second major side of the low modulus layer. A lamination process may include heat, pressure, adhesives, and the like. Under an embodiment, a compressive and elastic bonding component 150 may be produced with roll-to-roll lamination. For example, each of a low modulus material, a first adhesive material, and a second adhesive material may be positioned on a respective roll. Then, each material may be inserted into a roll-to-roll machine with the low modulus material in between the two adhesive materials. After the three layers are laminated via the roll-to-roll machine, the compressive and elastic bonding component 150 may be placed on an output roll. Under another embodiment, a compressive and elastic bonding component 150 may be produced through a wet coating and curing process. For example, a low modulus material may be inserted into a wet coating station. The wet coating station may apply a coating of liquid adhesive on both sides of the low modulus material, after which the liquid adhesive may be cured in a curing station by utilizing heat, ultraviolet light, or a combination of heat and ultraviolet light. The lamination process and the wet coating and curing process may include applying a release liner to one or more of the external surfaces of the compressive and elastic bonding component 150.

At step 816, the cover sheet 120 may be elastically bonded to the frame 140 with the compressive and elastic bonding component 150. At step 818, a sealing ring may seal the electronic device 110 by encompassing the compressive and elastic bonding component 150 that elastically bonds the cover sheet 120 to the frame 140.

Figure 9:
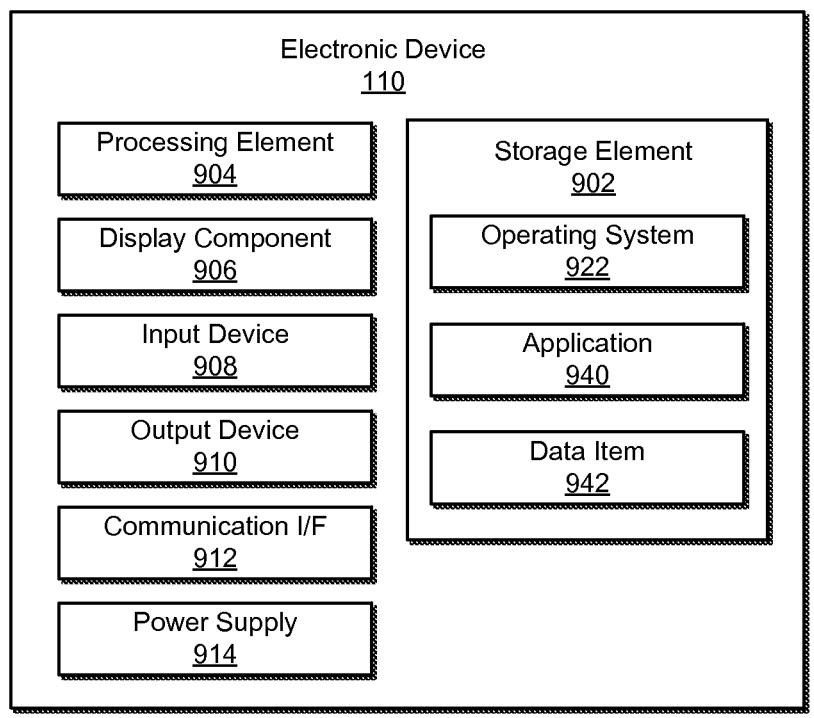
FIG. 9 illustrates an example block diagram of a mobile computing device in accordance with embodiments of the present invention.

FIG. 9 illustrates an exemplary block diagram of an electronic device 110, in accordance with embodiments of the present invention. The electronic device 110 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein.

The electronic device 110 may include a display component 906. The display component 906 may comprise the display assembly 130 or may alternatively comprise, for example, one or more devices such as cathode ray tubes (CRTs), liquid crystal display (LCD) screens, gas plasma-based flat panel displays, LCD projectors, or other types of display devices, etc.

The electronic device 110 may include one or more input devices 908 operable to receive inputs from a user. The input devices 908 can include, for example, a push button, touch pad, touch screen, wheel, joystick, keyboard, mouse, trackball, keypad, accelerometer, light gun, game controller, or any other such device or element with which a user can provide inputs to the electronic device 110. These input devices 908 may be incorporated into the electronic device 110 or operably coupled to the electronic device 110 via wired or wireless interface. For computing devices with touch sensitive displays, the input devices 908 can include a touch sensor that operates in conjunction with the display component 906 to permit users to interact with the image displayed by the display component 906 using touch inputs (e.g., with a finger or stylus). An example input device 908 is the touch sensing element 510 illustrated in FIG. 5.

The electronic device 110 may also include at least one communication interface 912, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the electronic device 110 may also include one or more wired communications interfaces for coupling and communicating with other devices.

The electronic device 110 may also include a power supply 914, such as, for example, a rechargeable battery operable to be recharged through conventional plug-in approaches, or through other approaches such as capacitive charging.

The electronic device 110 also includes a processing element 904 for executing instructions and retrieving data stored in a storage element 902. As would be apparent to one of ordinary skill in the art, the storage element 902 can include one or more different types of memory, data storage or computer-readable storage media, such as, for example, a first data storage for program instructions for execution by the processing element 904, a second data storage for images or data and/or a removable storage for transferring data to other devices.

The storage element 902 may store software for execution by the processing element 904, such as, for example, operating system software 922 and applications 940. The storage element 902 may also store a data item 942, such as, for example, data files corresponding to one or more applications 940.

Embodiments of the present invention may provide various advantages not provided by prior art systems. The electronic device may have enhanced touch sensing technology due to the strong bond of adhesive layers of the elastic bonding component, and may have increased durability in extreme environments due to the low modulus layer of the elastic bonding component dissipating stress experienced by the display assembly. For further example, the low modulus layer of the elastic bonding component may improve the durability of an electronic device when an object, such as a user's set of keys, is dropped on the cover sheet.

While the invention has been described in terms of particular embodiments and illustrative figures, those of ordinary skill in the art will recognize that the invention is not limited to the embodiments or figures described. For example, many of the embodiments described above in relation to electronic paper displays may be applied to other display assemblies such as a liquid crystal display that is backlit, and the like. For further example, many of the embodiments described above in relation to a frame may be applied to a frame with a bezel, such as a front panel of a housing.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the processes, flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An electronic device, comprising:
a frame comprising a base portion and four wall portions, each wall portion comprising an upper edge;
a compressive and elastic bonding component coupled to the upper edge of each wall portion of the frame, the compressive and elastic bonding component comprising:
a low modulus layer having a first major side and a second major side opposite the first major side, the low modulus layer comprising a cellular membrane structure;
a first adhesive layer adjacent the first major side of the low modulus layer; and
a second adhesive layer adjacent the second major side of the low modulus layer, the second adhesive layer coupled to each upper edge of each wall portion of the frame;
a cover sheet coupled to the first adhesive layer of the compressive and elastic bonding component, the cover sheet, the compressive and elastic bonding component, and the frame together defining a cavity of an interior region of the device; and
a display assembly comprising a first surface and a second surface, the first surface of the display assembly rigidly coupled to the cover sheet with a silicone optically clear adhesive, the display assembly positioned in the cavity of the interior region of the device, the display assembly being operable to display content, the second surface of the display assembly spaced apart from the base portion of the frame so as to allow movement of the display assembly.

2. The electronic device of claim 1, wherein:
the low modulus layer comprises one of a cross-linked polyethylene, a polyester polyurethane, an ethafoam polyethylene, a zotefoam polyethylene, or a polyether polyurethane material; and
the first adhesive layer and the second adhesive layer comprise one of an epoxy, a urethane, a silicone, a polyisobutylene, an acrylic, or a cyanoacrylate material.

3. An electronic device, comprising:
a frame comprising a base portion and four wall portions;
a cover sheet, wherein the cover sheet comprises glass and has four rim portions;
a compressive and elastic bonding component coupling the cover sheet to the frame, wherein each of the four rim portions of the cover sheet are coupled to a corresponding one of the four wall portions of the frame by the compressive and elastic bonding component; and
a display assembly rigidly coupled to the cover sheet, said display assembly being operable to display image content.

4. The electronic device of claim 3, wherein the compressive and elastic bonding component has a thickness of about 200 microns.

5. The electronic device of claim 3, wherein the compressive and elastic bonding component is configured to compress and elongate when the cover sheet bends.

6. The electronic device of claim 3, wherein the compressive and elastic bonding component comprises:
 a low modulus layer having a first major side and a second major side;
 a first adhesive layer adjacent the first major side of the low modulus layer, the first adhesive layer coupled to the cover sheet; and
 a second adhesive layer adjacent the second major side of the low modulus layer, the second adhesive layer coupled to the frame.

7. The electronic device of claim 6, wherein the low modulus layer comprises a foam that is compressible and expandable, the foam comprising one of a cross-linked polyethylene, a polyester polyurethane, an ethafoam polyethylene, a zotefoam polyethylene, and a polyether polyurethane material.

8. The electronic device of claim 6, wherein the low modulus layer is configured to dissipate internal stress of the display assembly.

9. The electronic device of claim 3, wherein the display assembly is spaced apart from the frame so as to allow bending of the display assembly and the cover sheet.

10. The electronic device of claim 3, further comprising:
 a touch sensing element coupled to the cover sheet and disposed adjacent to the display assembly and a respective wall portion of the frame.

11. The electronic device of claim 10, wherein the touch sensing element comprises a force sensing component configured to provide a variable resistance in response to an applied force.

12. The electronic device of claim 3, wherein the display assembly comprises a touch sensing element.

13. The electronic device of claim 3, wherein the cover sheet comprises one of glass, fortified glass, reinforced glass, plastic, and thermoplastic.

14. The electronic device of claim 3, further comprising:
 a sealing ring coupled to four rim portions of the cover sheet and coupled to respective upper edges of four wall portions of the frame, the sealing ring adjacent the compressive and elastic bonding component.

15. An electronic device, comprising:
 a frame comprising a base portion and four wall portions, each wall portion comprising an upper edge;
 a compressive and elastic bonding component coupled to the upper edge of each wall portion of the frame;
 a cover sheet coupled to the compressive and elastic bonding component, the cover sheet, the compressive and elastic bonding component, and the frame together defining a cavity of an interior region of the device; and
 a display assembly comprising a first surface and a second surface, the first surface of the display assembly rigidly coupled to the cover sheet, the display assembly positioned in the cavity of the interior region of the device, the display assembly being operable to display content, the second surface of the display assembly spaced apart from the base portion of the frame so as to allow movement of the display assembly.

16. The electronic device of claim 15, wherein the compressive and elastic bonding component comprises:
 a low modulus layer having a first major side and a second major side opposite the first major side, the low modulus layer comprising a cellular membrane structure;
 a first adhesive layer adjacent the first major side of the low modulus layer and coupled to the cover sheet; and
 a second adhesive layer adjacent the second major side of the low modulus layer, the second adhesive layer coupled to each upper edge of each wall portion of the frame.

17. The electronic device of claim 16, wherein:
 the low modulus layer comprises one of a cross-linked polyethylene, a polyester polyurethane, an ethafoam polyethylene, a zotefoam polyethylene, or a polyether polyurethane material; and
 the first adhesive layer and the second adhesive layer comprise one of an epoxy, a urethane, a silicone, a polyisobutylene, an acrylic, or a cyanoacrylate material.

18. The electronic device of claim 15, wherein the compressive and elastic bonding component has a thickness of about 200 microns.

19. The electronic device of claim 15, further comprising:
 a processing element coupled to the frame and electrically coupled to the display assembly; and
 a storage element electrically coupled to the processing element.

* * * * *